Figure 1:
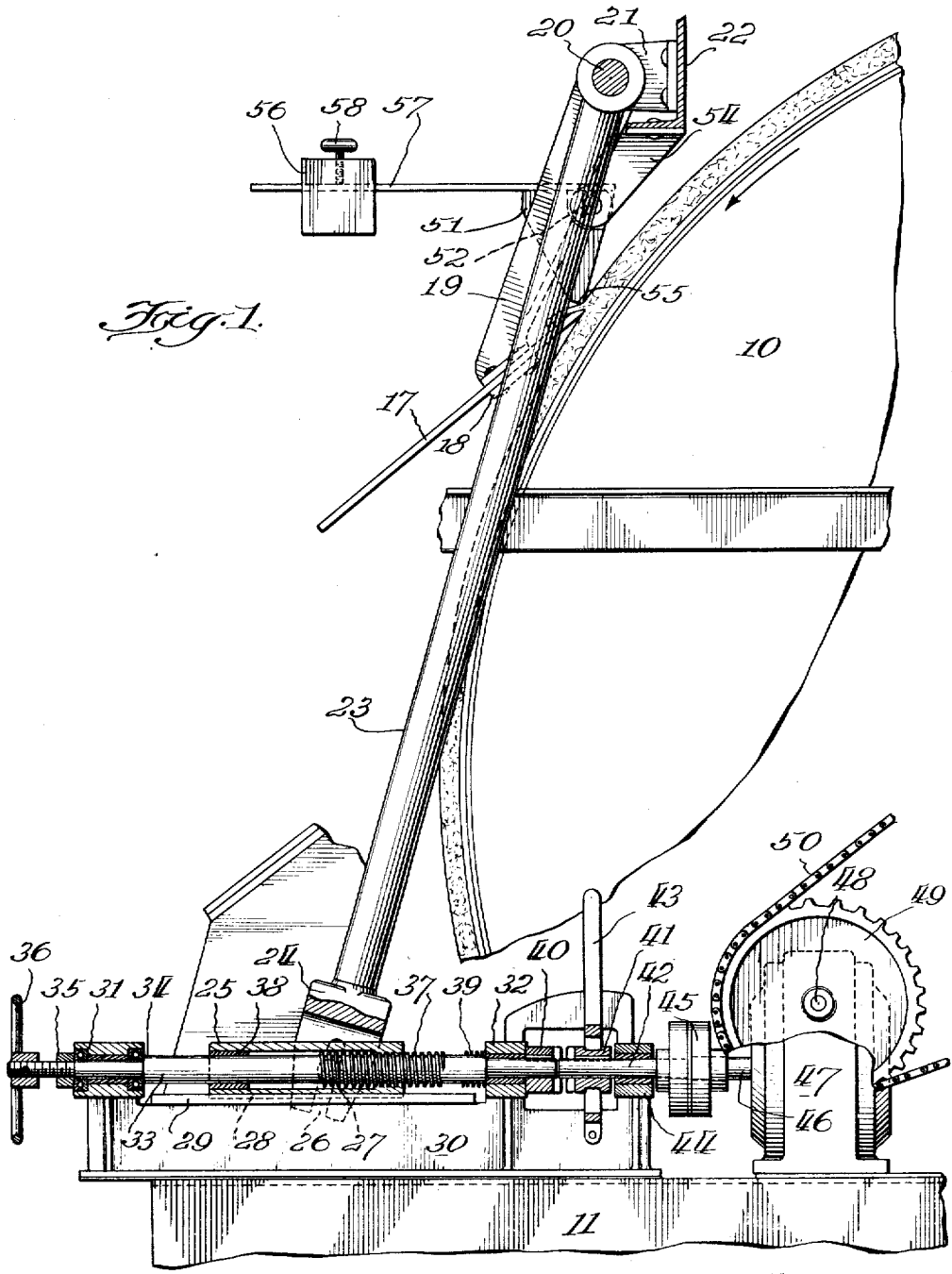

April 13, 1937.  A. J. BARNEBL  2,076,611
ROTARY FILTER
Filed June 27, 1935  2 Sheets-Sheet 1

Inventor:
August J. Barnebl
By Williams, Bradbury, McCaleb & Hinkle
Attys.

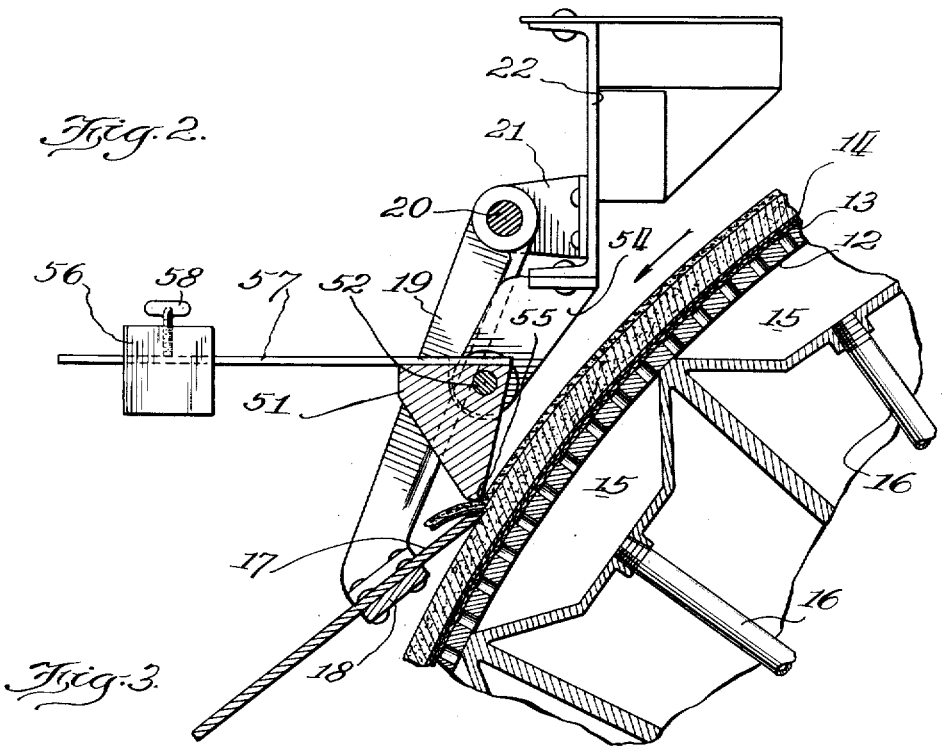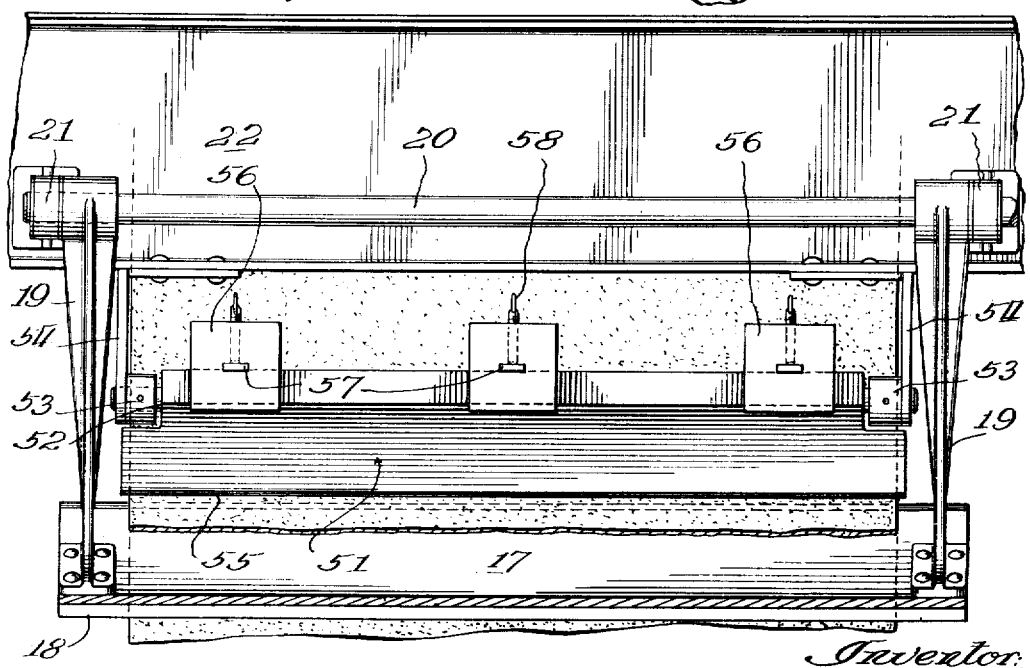

Patented Apr. 13, 1937

2,075,611

UNITED STATES PATENT OFFICE 2,075,611

ROTARY FILTER

August J. Barnebl, Chicago, Ill., assignor to Swenson Evaporator Company, Harvey, Ill., a corporation of Illinois Application June 27, 1935, Serial No. 28,667

5 Claims. (Cl. 210—201)

This invention relates to rotary filters, and particularly to rotary filters in which a layer of solids is maintained upon the filtering surface, the filtrate passing through said solids and said surface. The invention is particularly applicable to rotary filters in which a layer of precoat is applied to the filtering surface and it will be specifically described in connection with the type of filter described and claimed in my copending application Serial No. 745,201 filed September 24, 1934.

The aforesaid application discloses a rotary drum filter, the filtering surface being the cylindrical surface of the drum. In using this filter, a substantial layer of precoat is built up upon the filtering surface and then the filtering operation is commenced. During the filtering operation the filtered solids and part of the precoat layer are removed continuously as the drum rotates, by means of a knife. The filter comprises means for feeding the knife progressively towards the filtering surface at a slow rate, so that the precoat is removed in the form of a thin convolution presenting a new and highly effective filtering surface to the filtered liquid at all times.

Difficulties have been encountered owing to the fact that there is a tendency for the knife to lift off the precoat more than the desired thickness. In some cases the freshly shaved surface is found to be pitted. These pits may be considerably deeper than the thickness of precoat shaving removed, with the result that the surface of the pits becomes sealed by fine solids and other substances contained in the liquid to be filtered. This sealing persists until the particular pits are eradicated by the progressive cuts of the knife, at which time other pits have been formed. The total result is that the capacity of the filter is substantially cut down, and the principal object of the present invention is to provide means whereby the formation of such pits can be substantially avoided and the filtering capacity maintained during the operation of the filter.

The invention will readily be understood from the following description of a preferred embodiment thereof, taken in conjunction with the accompanying drawings, in which Figure 1 is a fragmentary end elevational view of a rotary filter embodying my invention;

Fig. 2 is a sectional detail view through the knife and adjacent portion of the filter drum and through the cake presser element, and Fig. 3 is a fragmentary view showing these elements in front elevation.

Referring to the drawings, the reference numerals pivotally mounted on its axis and partly immersed in liquid to be filtered contained in a tank 11. The cylindrical surface of the drum may suitably comprise a perforated wall 12 over which is applied a fine mesh screen 13 supporting and covered by a suitable fabric 14, as best shown in Fig. 2. On the inner side of the wall 12 are formed pockets 15, which communicate through pipes 16 with the hollow trunnion (not shown) of the drum 10, through which suction or a vacuum is applied in known manner to draw liquid and air into the pockets 15. It will be understood that the drum 10 is rotated at a slow speed by any suitable or conventional mechanism (not shown).

I provide a knife 17 for shaving off the solid material which is to be separated from the liquid and also a small amount of precoat material. This knife is rigidly mounted on a strong transverse bar 18, which in turn is supported by means of depending arms 19 from a horizontal bar 20. The horizontal bar 20 is rotatably mounted in bearings 21 carried by a stationary transverse member 22. The transverse member 22 is located above the tank 11 so that the knife 17 operates on the filter surface above the level of the tank, as shown in Fig. 1, and preferably on the downwardly moving side of the drum 10. It will readily be seen from Fig. 1 that any material shaved off the drum 10 by the knife 17 can fall clear of the tank 11.

At one end the bar 20 has rigidly secured thereto a lever 23 which extends downwardly towards the top of the tank 11 and its lower end is provided with a bifurcated member 24. The legs of the bifurcated member lie on each side of a nut 25. Each leg of the member 24 is provided with an axial slot 26 which receives a trunnion 27, these trunnions projecting laterally from the nut 25. The nut 25 is provided with a longitudinal keyway 28 which receives, with a sliding fit, a key 29 formed on a base 30, the base being rigidly mounted on the upper edge of the tank 11.

The base 30 is provided with bearings 31 and 32 for a shaft 33. The bearing 31 is a double-thrust bearing and the shaft 33 is held against longitudinal movement by means of a shoulder 34 formed thereon, and a nut 35 threadedly mounted on the reduced and threaded portion of the shaft on the other side of the bearing 31 from the shoulder 34.

At its outermost end the shaft 33 is provided with a manually operable wheel 36, whereby the shaft 33 may be rotated by hand. The shaft 33 is provided with a relatively long threaded portion 37 which is adapted to cooperate with a relatively short threaded portion of the nut 25. At the other end, the nut 25 is provided with an internal sleeve or bushing 38 which receives the unthreaded portion of the shaft 33 with a free sliding fit.

A coil spring 39 is located around the shaft 33 between the threaded portion 37 and the bearing 32. When the shaft 33 is rotated from the filter during its operation, as will hereinafter be described, the nut 25 is moved progressively to the right as viewed in Fig. 1, until the threaded portion of the nut runs off the threaded portion 37 of the shaft 33. Before this occurs, the spring 39 comes into engagement with the nut 25 and prevents movement of the knife 17 into contact with the filter fabric 14 of the drum 10. Furthermore, the spring 39 keeps the threaded portion of the nut 25 against the threaded portion 37 of the shaft, and when the shaft 33 is rotated in the opposite direction, the nut 25 immediately screws on to the threaded portion 37.

On the other side of the bearing 32 from the spring 39, the shaft 33 has rigidly mounted thereon a clutch member 40. This clutch member is adapted to be engaged by a complementary clutch member 41 slidably mounted on, and keyed to, a shaft 42 which is in alignment with the shaft 33. The clutch member 41 can be slid into and out of engagement with the clutch member 40 by means of a forked hand lever 43 which is pivotally mounted upon the base or casting 30. This casting also provides a bearing 44 for the shaft 42 and this shaft is connected by a suitable coupling 45 to the output shaft 46 of a gear reduction unit 47. The input shaft 48 of the gear reduction unit 47 carries a sprocket wheel 49 which is driven by a chain 50. This chain passes over a sprocket (not shown) mounted on the trunnion of the drum 10 so that all the mechanism, including the knife, is operated continuously by the rotation of the drum. Because of the gear reduction unit 47, which may have any suitable ratio, the shaft 46 and, when the clutch lever 43 is in proper position, the shaft 33, may be made to rotate at the desired relatively slow speeds. Consequently, the nut 25 moves quite slowly and the knife 17 moves toward the filter fabric 14 at a very slow rate indeed.

Ordinarily, it is preferred that the movement of the knife 17 towards the filtering surface of the drum should not exceed 0.005" per revolution of the drum.

According to the present invention, I provide a cake presser element which is adapted to cooperate with the knife 17 and prevent the production of a surface having pits or depressions of any substantial size below the desired shaved surface. In the embodiment illustrated, the cake presser element is constituted by a bar of wood 51 which extends transversely across the filter surface of the drum immediately above the knife 17. It is pivotally supported at each end by means of pivot studs 52 which are rotatable in bearings 53 carried by brackets 54 which are rigidly mounted on the stationary transverse member 22. The presser element 51 is provided with a corner 55 which is adapted to bear against the filter cake slightly in front of the cutting edge of the knife 17 so as to apply pressure thereto. The pressure applied can be adjusted by means of weights 56 which are adjustably mounted on rods 57 carried by the bar 51 and projecting outwardly therefrom away from the filter drum. The weights 56 can be secured in desired position on the rods 57 by means of thumb screws 58. It is preferred to locate the corner 55 quite close to the edge of the knife 17. I prefer to have this corner about 1/16" or 1/8" ahead of the cutting edge in the circumferential direction of the drum. In this way the cake, including the filter cake and the precoat, immediately ahead of the knife, is maintained under pressure. It is my belief that the objectionable pitting and roughness of the shaved surface heretofore experienced has been due to the fact that the cutting effected by the knife has not been confined to the edge of the knife. There is a tendency for the filter cake to crake up ahead of the knife. Such cracking up is effectively prevented by the pressure applied by the presser element 51, with the result that a much more perfect shaved surface is produced.

A typical operation of the filter will now be described. In this operation is employed a porous precoat formed from suitable precoat materials which are well known in the art and comprise foraminous or granular materials such as some clays, fuller's earth, diatomaceous earth and the like. The precoat used is applied as a layer upon the filtering surface before filtration is started.

One manner in which this may be accomplished is to place a slurry of the precoat, that is, a suspension of precoat in water, into the tank 11 and start the filter drum revolving. At the same time vacuum is applied to the chambers 15, with the result that the liquid component of the slurry, usually water, is drawn through the filter fabric 14 and a layer of precoat is deposited on the surface of the fabric. This building up is continued until the desired depth of precoat, for example about 1" or 1½", is attained. Before the precoat is formed upon the filtering surface of the filter drum, the knife 17 is backed up out of the way of the precoat. This is readily effected by throwing the clutch lever 43 into disengaged position and turning the shaft 33 by the hand wheel 36 so as to fit the nut 25 to the left, as viewed in Fig. 1. This movement is continued until the nut 25 hits against the bearing 31, or at least until sufficient clearance has been provided for a precoat of desired depth.

After the precoat is formed, the tank 11 may be drained and washed and then the material to be filtered is supplied thereto. The drum being in rotation and vacuum being applied to the chambers 15, the liquid component of the material being filtered is withdrawn through the precoat layer into the chambers 15, from which it passes in the usual way.

A deposit of solid material is now built on top of the precoat layer. The knife 17 is now advanced toward the filtering surface of the drum which may be effected by suitable rotation of the hand wheel 36 until the knife removes the coat of filtered material and preferably also a slight cut of precoat. Thereupon, the clutch lever 43 is thrown into clutch-engaging position and thereafter the knife 17 feeds progressively towards the filtering surface of the drum so as to remove the filtered solids and also to remove a very slight cut, preferably less than 0.005", of precoat during each revolution.

If desired, the precoat layer may be trued by advancing the knife to the necessary depth by the hand wheel 47, before the introduction of the material to be filtered.

As indicated above, the feeding of the knife 17 towards the filtering surface continues until the threaded portion of the nut 25 runs off the thread 37 of the shaft 33, whereupon the spring 39 prevents the further advance of the knife 17 and the knife is automatically prevented from advancing far enough to contact the underlying fabric or drum. When this occurs, the nut 25 may be retracted by hand and a new precoat layer built up.

It is preferred to drain the tank 11 before the advance of the knife 17 terminates, and to shave the complete precoat surface before building up a new precoat layer thereon. This expedient enables me to avoid the presence of impervious or substantially impervious zones within the precoat layer.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A filter comprising a rotary filtering surface, a knife adapted to shave material off said surface, means for maintaining said knife in spaced relation to said surface whereby only a part of said material is removed by the knife, and means for applying pressure on said material in the cutting position immediately in front of the cutting edge of the knife.

2. A filter comprising a rotary filtering surface, adapted to receive a precoat of substantial thickness, a knife adapted to shave filtered solids and a thin layer of precoat off said surface, automatic means for feeding said knife slowly and progressively towards the filtering surface, and means for applying pressure on said material and precoat in the cutting position immediately in front of the cutting edge of the knife.

3. A filter comprising a rotary filtering surface, a knife adapted to shave material off said surface, and a pivotally supported bar applying pressure on said material at the shaving position.

4. A filter comprising a rotary filtering surface, a knife adapted to shave material off said surface, means for maintaining said knife in spaced relation to said surface whereby only a part of said material is removed by the knife, and a pivotally supported bar applying pressure on said material immediately in front of the cutting edge of the knife.

5. A filter comprising a rotary filtering surface adapted to receive a precoat of substantial thickness, a knife adapted to shave filtered solids and a thin layer of precoat off said surface, automatic means for feeding said knife slowly and progressively towards the filtering surface, and a pivotally supported bar applying pressure on said material immediately in front of the cutting edge of the knife.

AUGUST J. BARNEBL.

CERTIFICATE OF CORRECTION.

Patent No. 2,076,611.  April 13, 1937.

AUGUST J. BARNEBL.

It is hereby certified that error appears in the printed specification of the above numbered patent requiring correction as follows: Page 1, first column, after line 55, insert the syllable and words meral 10 indicates a filter drum of known type; and that the said Letters Patent should be read with this correction therein that the same may conform to the record of the case in the Patent Office.

Signed and sealed this 1st day of June, A. D. 1937.

(Seal)

Henry Van Arsdale
Acting Commissioner of Patents.

As indicated above, the feeding of the knife 17 towards the filtering surface continues until the threaded portion of the nut 25 runs off the thread 37 of the shaft 33, whereupon the spring 39 prevents the further advance of the knife 17 and the knife is automatically prevented from advancing far enough to contact the underlying fabric or drum. When this occurs, the nut 25 may be retracted by hand and a new precoat layer built up.

It is preferred to drain the tank 11 before the advance of the knife 17 terminates, and to shave the complete precoat surface before building up a new precoat layer thereon. This expedient enables me to avoid the presence of impervious or substantially impervious zones within the precoat layer.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A filter comprising a rotary filtering surface, a knife adapted to shave material off said surface, means for maintaining said knife in spaced relation to said surface whereby only a part of said material is removed by the knife, and means for applying pressure on said material in the cutting position immediately in front of the cutting edge of the knife.

2. A filter comprising a rotary filtering surface, adapted to receive a precoat of substantial thickness, a knife adapted to shave filtered solids and a thin layer of precoat off said surface, automatic means for feeding said knife slowly and progressively towards the filtering surface, and means for applying pressure on said material and precoat in the cutting position immediately in front of the cutting edge of the knife.

3. A filter comprising a rotary filtering surface, a knife adapted to shave material off said surface, and a pivotally supported bar applying pressure on said material at the shaving position.

4. A filter comprising a rotary filtering surface, a knife adapted to shave material off said surface, means for maintaining said knife in spaced relation to said surface whereby only a part of said material is removed by the knife, and a pivotally supported bar applying pressure on said material immediately in front of the cutting edge of the knife.

5. A filter comprising a rotary filtering surface adapted to receive a precoat of substantial thickness, a knife adapted to shave filtered solids and a thin layer of precoat off said surface, automatic means for feeding said knife slowly and progressively towards the filtering surface, and a pivotally supported bar applying pressure on said material immediately in front of the cutting edge of the knife.

AUGUST J. BARNEBL.

CERTIFICATE OF CORRECTION.

Patent No. 2,076,611.　　　　　　　　　　　　　　　April 13, 1937.

AUGUST J. BARNEBL.

It is hereby certified that error appears in the printed specification of the above numbered patent requiring correction as follows: Page 1, first column, after line 55, insert the syllable and words meral 10 indicates a filter drum of known type; and that the said Letters Patent should be read with this correction therein that the same may conform to the record of the case in the Patent Office.

Signed and sealed this 1st day of June, A. D. 1937.

(Seal)　　　　　　　　　　　　　　　　　　　Henry Van Arsdale
　　　　　　　　　　　　　　　　　　　Acting Commissioner of Patents.

CERTIFICATE OF CORRECTION.

Patent No. 2,076,611.                                          April 13, 1937.

AUGUST J. BARNEBL.

It is hereby certified that error appears in the printed specification of the above numbered patent requiring correction as follows: Page 1, first column, after line 55, insert the syllable and words meral 10 indicates a filter drum of known type; and that the said Letters Patent should be read with this correction therein that the same may conform to the record of the case in the Patent Office.

Signed and sealed this 1st day of June, A. D. 1937.

Henry Van Arsdale (Seal)         Acting Commissioner of Patents.